G. W. PROUTY.
MACHINE FOR WRAPPING BALES.
APPLICATION FILED SEPT. 16, 1916.
1,253,884.
Patented Jan. 15, 1918.
5 SHEETS—SHEET 1.
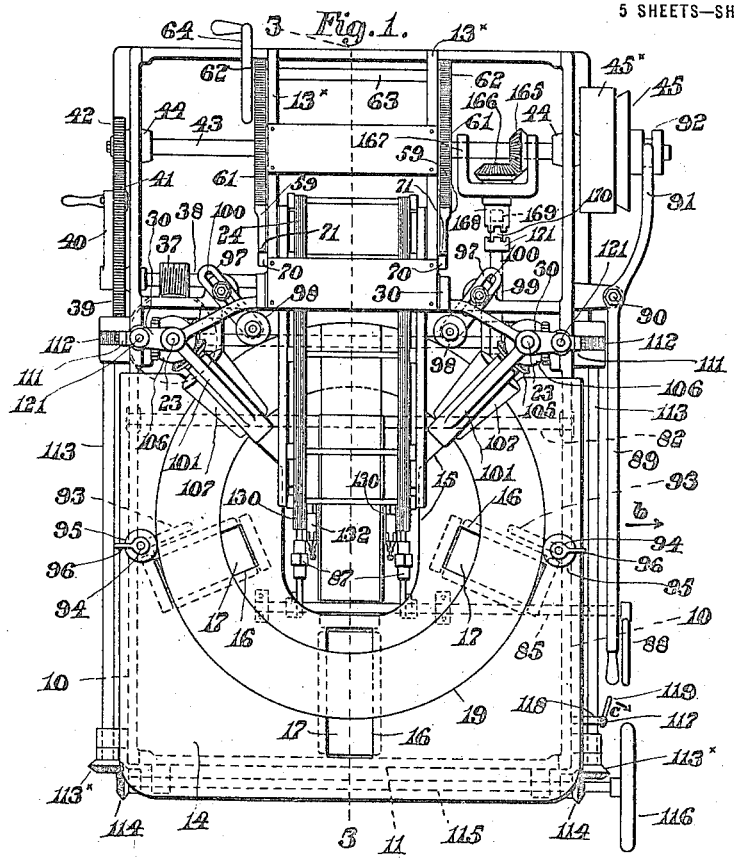
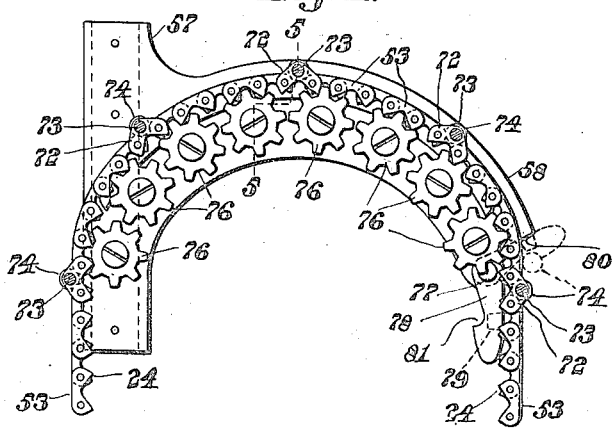
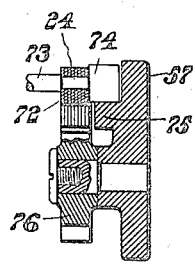
Inventor:
George W. Prouty,
by Walter E. Lombard,
Atty.

G. W. PROUTY.
MACHINE FOR WRAPPING BALES.
APPLICATION FILED SEPT. 16, 1916.
1,253,884.
Patented Jan. 15, 1918.
5 SHEETS—SHEET 2.
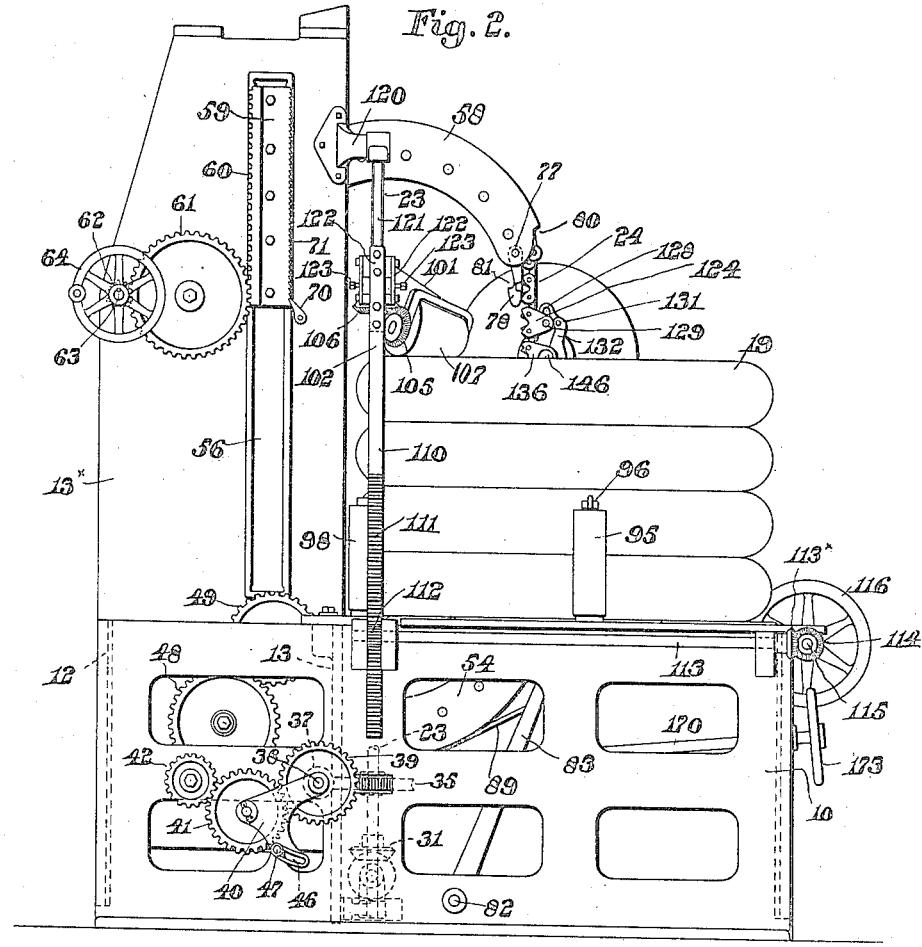
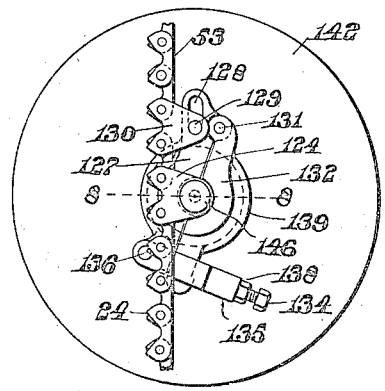
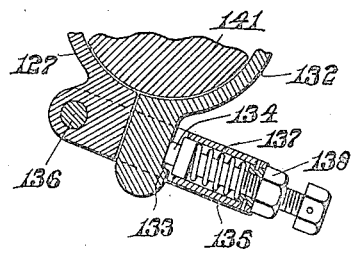
Inventor:
George W. Prouty,
by Walter E. Lombard.
Atty.

G. W. PROUTY.
MACHINE FOR WRAPPING BALES.
APPLICATION FILED SEPT. 16, 1916.

1,253,884.

Patented Jan. 15, 1918.
5 SHEETS—SHEET 3.

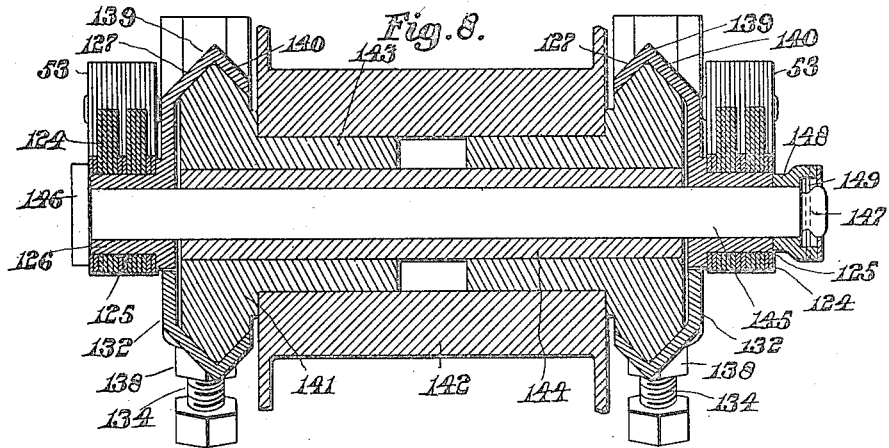
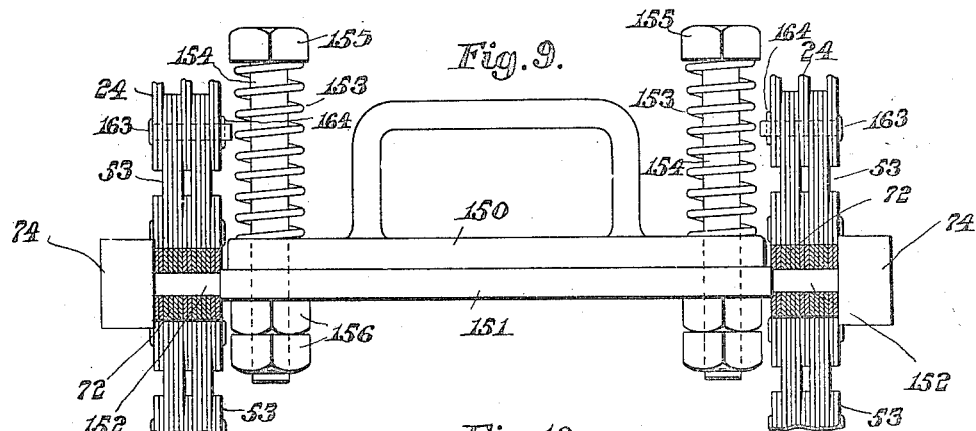
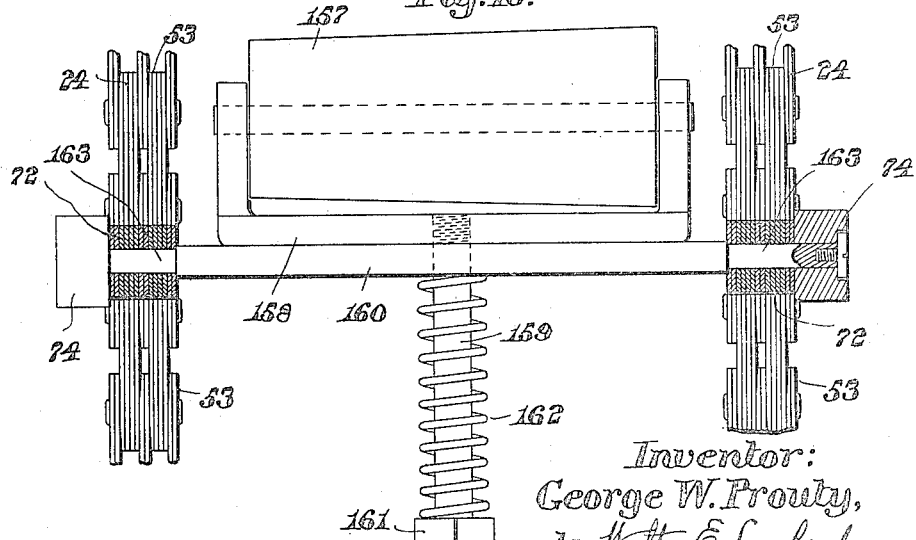

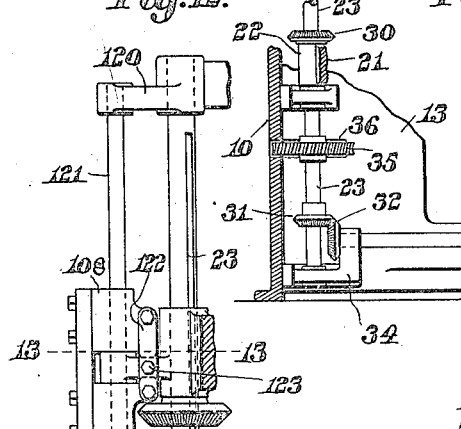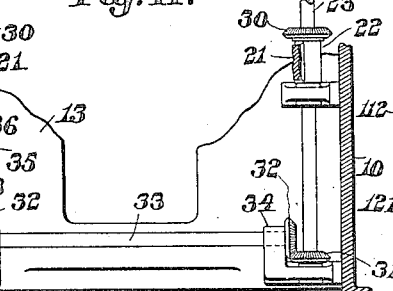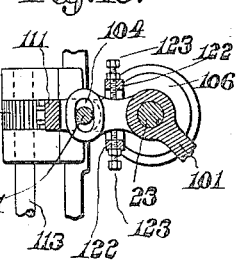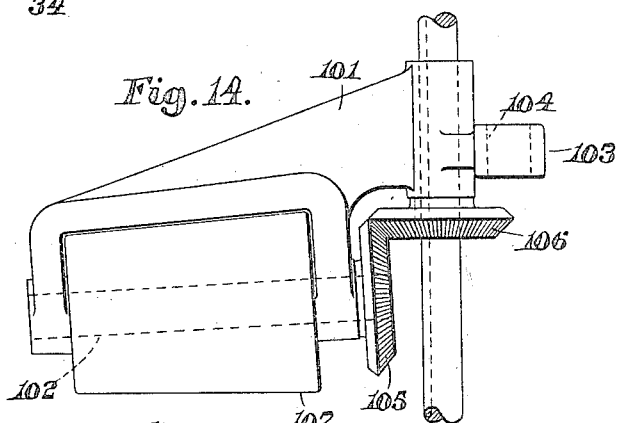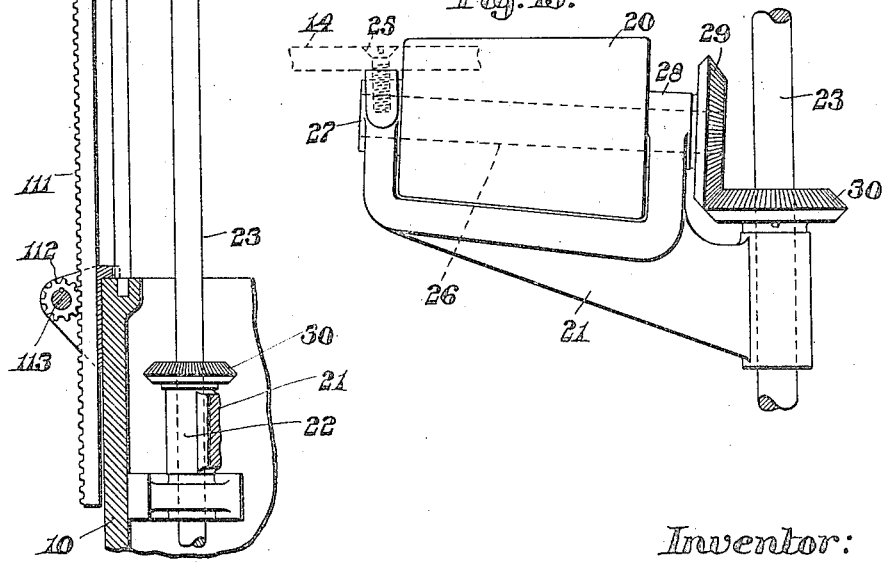

UNITED STATES PATENT OFFICE.

GEORGE W. PROUTY, OF DORCHESTER, MASSACHUSETTS.

MACHINE FOR WRAPPING BALES.

1,253,884.    Specification of Letters Patent.    Patented Jan. 15, 1918.

Application filed September 16, 1916. Serial No. 120,302.

*To all whom it may concern:*

Be it known that I, GEORGE W. PROUTY, a citizen of the United States of America, and a resident of Dorchester, in the county of Suffolk and Commonwealth of Massachusetts, have invented certain new and useful Improvements in Machines for Wrapping Bales, of which the following is a specification.

This invention relates to wrapping machines, and has for its object the production of a machine of this character adapted to wrap a strip of material in a plurality of overlapping helixes over the inside and outside walls of a bale of manufactured goods in order to provide a neat package and protect the goods from damage during transportation.

The present invention is an improvement upon the invention shown and described in Letters Patent No. 1,179,035, issued to me April 11, 1916.

For the purpose of illustrating the invention, one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described.

Of the drawings:

Figure 1 represents a plan of a machine embodying the principles of the present invention.

Fig. 2 represents a side elevation of the same.

Fig. 4 represents an elevation of one of the conveyer supports.

Fig. 5 represents a section on line 5—5 on Fig. 4.

Fig. 6 represents an elevation of the carrier for the wrapping material and the devices for supporting said carrier on the flexible conveyer.

Fig. 7 represents a sectional detail of the same.

Fig. 8 represents a section on line 8—8 on Fig. 6.

Fig. 9 represents an elevation of the device for creating friction on the strip of wrapping material.

Fig. 10 represents an elevation of the device for taking up the slack in the strip of wrapping material.

Fig. 11 represents a vertical section of a portion of the frame and showing the mechanism for driving the vertical shafts from which motion is imparted to the bale supporting members and the pressure rolls.

Fig. 12 represents a vertical section showing one of said operating shafts and the means for raising and lowering the pressure rolls.

Fig. 13 represents a horizontal section on line 13—13 on Fig. 12.

Fig. 14 represents an elevation of one of the pressure rolls and its operating devices, and Fig. 15 represents an elevation of one of the bale supporting members and its operating devices.

Figure 3:
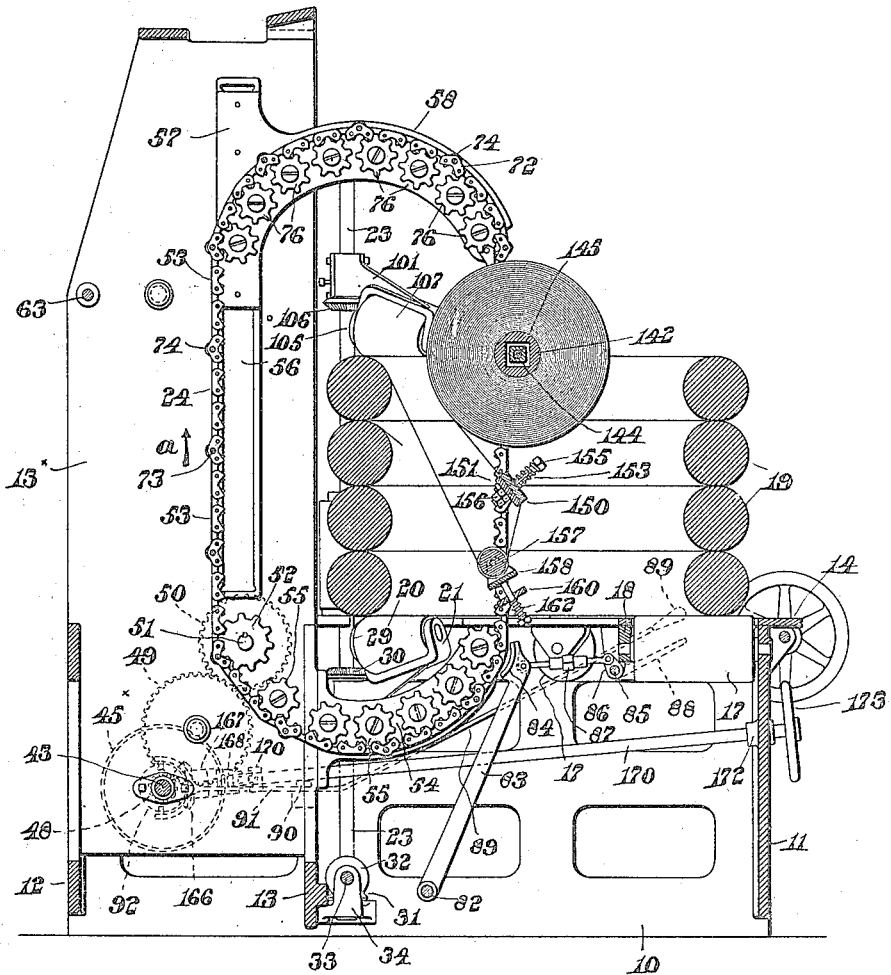
Fig. 3 represents a vertical section of the same on line 3—3 on Fig. 1.

In the drawings, 10—10 are two side frames connected by the front plate 11, the rear plate 12, and the intermediate tie 13. Superimposed upon the side frames 10 and the front plate 11 is a top plate 14, having the central and rear portion thereof cut away as indicated at 15 in Fig. 1 of the drawings.

On either side of the opening 15 and in front thereof are smaller openings 16 in which are positioned revoluble supporting members 17 having trunnions mounted in brackets 18 depending from the under side of the top plate 14. These revoluble supporting members 17 extend slightly above the upper face of the top plate 14 and are adapted to support a plurality of annular members 19 which it is desired to wrap into a bale for transportation. In the rear end of the opening 15 are other supporting members 20 revolubly mounted in brackets 21, each having a hub 22 surrounding a vertical shaft 23 positioned at one side of an endless flexible conveyer 24.

These supporting members 20 are cone-shaped with their axes radiating from a central point in the opening 15. Each member 21 is secured to the under face of the top plate 14 by means of a screw 25, thereby preventing vertical movement of said brackets 21 and retaining the members 20 in position with a portion of the periphery thereof slightly above the upper face of the top plate 14, as indicated in Fig. 15 of the drawings. Each tapered member 20 is mounted upon and revolves with a shaft 26 revolubly mounted in bearings 27 and 28 in the bracket 21. Each shaft 26 extends beyond the bearing 28 toward the vertical shaft 23, and has secured thereto a bevel gear 29 meshing with a bevel gear 30 secured to and revoluble with a vertical shaft 23. As the shaft 23 is rotated the movement thereof is imparted through the gears 29 to the tapered supporting members, causing these members to revolve and impart rotary movement to the plurality of annular members 19 superimposed upon the supporting members 17 and 20. Each vertical shaft 23 has secured to its lower end a bevel gear 31 meshing with a bevel gear 32 mounted upon a horizontal shaft 33 revolubly mounted in brackets 34 secured to the inner faces of the side frames 10. One of the vertical shafts 23 has secured thereto a worm wheel 35, a portion of which extends through a slot 36 in the intermediate tie plate 13 so that the teeth of said worm gear may mesh with a worm 37 on a revoluble shaft 38 extending through one of the side frames 10 and having mounted thereon a gear 39. Pivotally mounted upon the outer end of the shaft 38 is a member 40 having removably mounted thereon an intermediate gear 41 meshing with a driving gear 42 secured to the outer end of a horizontal shaft 43 revolubly mounted in bearings 44 in the side frames 10.

The opposite end of the shaft 43 has splined thereto a clutch member 45 to which rotary movement is imparted by means of the loose pulley 45ˣ when said clutch member 45 has been moved into frictional contact with said loose pulley. When the shaft 43 is rotated, rotary movement thereof is imparted through the gears 42, 41, and 39 to the worm 37, which causes the worm gear 35 to revolve and rotate one of the vertical shafts 23, the rotary movement of this shaft being imparted to the other vertical shaft 23 by means of the gears 31 and 32 and the transverse shaft 33.

The member 40 is provided with a slot 46 through which extends a clamping member 47 secured to one of the side frames 10. When it is desired to change the speed of the vertical shafts 23, the intermediate gear 41 and driving gear 42 may be removed and other gears of different sizes substituted therefor and the member 40 adjusted in its position about the axis of the shaft 38 to accommodate itself to the new gears, and then clamped in its adjusted position by means of the member 47.

On the horizontal shaft 43 is secured a pinion meshing with an intermediate gear 49, which in turn meshes with a gear 50 having a stud 51 extending through one of the transoms 13ˣ extending upwardly above the top plate 14 near the rear plate 12 and the intermediate plate 13. This stud 51 has splined thereto a gear 52 which imparts motion to the conveyer 24. The conveyer 24 is made up of a plurality of layers 53 pivoted together with projections thereon forming teeth adapted to mesh with the teeth of the driving gear 52.

When the rotary movement is imparted to the gear 52 the conveyer 24 is moved in the direction of the arrow $a$ on Fig. 2 of the drawings.

Extending forwardly from the front face of the intermediate plate 13 are two brackets 54 having revolubly mounted thereon a plurality of toothed members 55, the teeth of which the teeth of the conveyer 24 engage as the conveyer plate is moved in the direction of the arrow $a$. Each vertical transom 13ˣ is provided with a guide slot 56 in which is slidably mounted a bracket 57 having a forwardly extending curved arm 58.

Secured to the outer face of each bracket 37 is a plate 59 having a plurality of rack teeth 60 formed in the rear edge thereof, said teeth meshing with a revoluble gear 61 driven by a pinion 62 mounted upon a shaft 63 extending through the transoms 13ˣ and having secured to one end thereof an operating wheel 64, by turning which the brackets 57 may be raised and lowered into position to accommodate various lengths of endless flexible conveyers 24. When adjusted into the proper position each bracket 57 is retained in such position by means of a pawl 70 engaging the ratchet teeth 71 in the front edge of each plate 59.

At spaced distances apart the endless conveyer 24 is provided with links 72 the central portions of which extend outwardly in the rear edges of the links 53, as clearly shown in Fig. 4 of the drawings. These links 72 of one chain are connected by means of rods 73 with corresponding links in the other chain of the endless conveyer 24. On the outer ends of these rods 73 are revoluble rollers 74 which ride on the flanges 75 extending inwardly from the brackets 57—58 and thereby support the various links 53—72 as they move along the sides of the brackets 57—58 and prevent the teeth thereof from wedging into the teeth of the supporting toothed members 76 mounted upon the inner face of the brackets 57—58. Pivoted at 77 to the front end of each of the arms 58 of the brackets 57 is a dog 78 having a lug 79 extending from the outer face thereof, as shown in Figs. 2 and 4 of the drawings.

When it is desired to remove some of the links from the conveyer 24 to shorten the same, or to add additional links to lengthen the same, the dog 78 is moved into the position shown in dotted lines in Fig. 4 of the drawings, with the lug 79 bearing against the shoulder 80 at the front end of the arm 58 and while in this position the conveyers are moved in a direction opposite to the arrow $a$ on Fig. 3 of the drawings until one of the rollers 74 engages the notch 81 in the dog 78, thus preventing further rearward movement of the conveyer 24.

Mounted in the side frames 10 is an oscillating shaft 82 having secured thereto a pair of arms 83 having at the upper ends thereof contact surfaces 84 adapted to be forced against the links 53 to retain the lower part of the conveyer 24 in position when a portion of said conveyer is being removed or replaced.

In practice, depending from the under face of the top plate 14 is an oscillating shaft 85 having two short arms 86 extending upwardly therefrom, the outer ends of said arms being connected to the outer ends of the arms 83 by the adjustable connectors 87. To the outer end of the oscillating shaft 85 is secured an operating handle 88, which is adapted to be moved into a vertical position to straighten the toggle members 86—87, and thereby lock the arms 83 in firm contact with the endless conveyer 24. When the operating handle 88 has been moved into its vertical position, it is in the path of movement of the shipper member 89 pivoted at 90 and having a forked end 91 straddling the grooved hub 92 of the clutch member 45. When the clutch member 45 is in the position shown in Fig. 1 of the drawings, it is free from contact with the loose pulley $45^\times$ and no rotary movement will be imparted thereto. In order to start the machine it is necessary to move the shipper member 89 in the direction of the arrow $b$, as shown in Fig. 1 of the drawings. This can only be done when the operating handle 88 is in the position shown in dotted lines in Fig. 3 of the drawings. When the conveyer 24 is locked from movement by means of the arms 83 contacting therewith and the handle 88 is in a vertical position, it is obvious that the shipper member 89 can be moved in the direction of the arrow $d$ to start the machine.

In the top plate 14 are two slots 93 in which are mounted vertical members 94 surrounded by rollers 95 adapted to bear against the periphery of the plurality of annular members 19 upon the supporting members 17 and 20. When the vertical members 94 have been adjusted properly in the slots 93 they are locked in position by means of the clamping members 96. On each side of the conveyer 24 is a slotted plate 97 having at its inner ends a revoluble roller 98 adapted to contact with the periphery of the plurality of cylindrical members on the supporting rollers 17 and 20. The clamping member 99 extends through the slot 100, and by means of this clamping member 99 the member 97 may be secured in its adjusted position. These vertical rollers 95 and 98 properly position the cylindrical annular members on their supporting members 17 and 20 and insure their rotation about the same vertical axis when the machine is in operation.

Splined to each of the vertical shafts 23 is a bracket 101, said bracket being provided with a lateral shaft 102 and a laterally extending arm 103 having an elongated slot 104 on the outer end thereof. On the shaft 102 is secured a bevel gear 105 meshing with a bevel gear 106 splined to the shaft 23. Secured to and revoluble with the shaft 102 is a pressure roller 107, said pressure roller being cone-shaped, as shown in Fig. 14 of the drawings. When the shaft 23 is rotated, the rotation of the gear 106 meshing with the gear 105 causes a rotation of the pressure roller 107. The arm 103 is positioned between two blocks 108 and 109 secured to a vertical bar 110 having in one face thereof a plurality of rack teeth 111 with which engage the teeth of a pinion 112 mounted upon and revoluble with a shaft 113. Each shaft 113 is mounted in bearings extending outwardly from the side frames 10, and at the other end of each shaft is a gear $113^\times$ meshing with the gear 114 on a shaft 115 extending through said side plates and having an operating wheel 116 on one end thereof.

When the wheel 116 is operated to rotate the shaft 115, the shafts 113 are simultaneously rotated and cause the bar 110 to be raised or lowered at will. This raising and lowering of the bar 110 causes the bracket 101 to be moved endwise of the vertical shaft 23. When by means of this mechanism the pressure rollers have been forced firmly in contact with the upper end of the stack of members on the supporting members 17 and 20, they can be locked in this adjusted position by means of the cam member 117 pivoted to a bracket 118 extending outwardly from the side frame 10 and having an operating handle 119 formed thereon. When the handle 119 is in the position shown in Fig. 1 of the drawings, the shafts 113 are free to be rotated by the handle 116, but when the handle 119 is moved in the direction of the arrow $c$ on Fig. 1 of the drawings, the eccentric cam portion 117 will be wedged against the shaft 113 and lock it from further rotation.

Secured to the upper end of each of the transoms $13^\times$ is a bracket 120 which forms a bearing for the upper end of the revoluble shaft 23, and also provides a support for the upper end of a rod 121 extending downwardly through the blocks 108 and 109 and through the slot 104 in the arm 103 positioned between said blocks 108 and 109, the lower end of said rod being positioned in a side frame 10. This rod assists in positioning a bracket 101 and prevents it from becoming slightly inclined to the axis of the shaft 23 as it is moved lengthwise thereof. The opposite faces of the blocks 108 and 109 are connected by plates 122, each having an adjusting member 123 threaded thereto, the ends of which bear against the opposite faces of the arm 103, as shown in Fig. 13 of the drawings.

By means of these adjusting members 123, the bracket 101 may be moved slightly about the axis of the shaft 23 in an obvious manner. Two of the links of each of the conveyer chains are of special construction, as shown in Fig. 6 of the drawings, one pair of said links 124 extending outwardly some distance beyond the outer edges of the links 53 and have openings 125 therein in which are positioned the hubs 126 of one part 127 of a friction device. This part 127 is provided with a slot 128 into which extends a lug 129 extending laterally from each of the other pair of specially constructed links 130. Pivoted at 131 is the other part 132 of the friction device, the opposite end of which is provided with a locking shoulder 133 adapted to coact with the locking bolt 134 carried by a bail 135 pivoted at 136 to the first-mentioned part 127 of the friction device.

The locking bolt 134 is forced inwardly by means of the spring 137, the tension of which may be regulated by means of the nut 138. The members 127 and 132 are provided with semi-annular flanges 139 having inclined walls fitted over the inclined peripheral walls 140 of the members 141 projecting outwardly from the opposite faces of the drum 142 carrying in a roll a strip of wrapping material. Each member 141 is provided with a flat sided hub 143 extending into the flat sided core of the drum 142.

Each of the members 141 is mounted upon a flat sided sleeve 144 revolubly mounted upon a pin 145 extending through the hubs 126 on each of the conveyer chains. This pin 145 is provided with a head 146 at one end and an annular groove 147 at the opposite end. When the pin 145 has been inserted through the hubs 126 it is locked in position by means of an annular member 148 inserted over the grooved end 147 and provided with yielding spring members 149 adapted to engage with the groove in said grooved end 147 and prevent the accidental displacement thereof.

When it is desired to insert a new drum 142 with the wrapping material thereon, the locking member 148 is disengaged from the annular peripheral groove in the end of the member 145, and then this member 145 is removed from the chains 24. The bail 135 is then moved about its pivot 146 and the parts 127 and 132 are moved about the pivot 131 to remove the flange 139 from the peripheral walls 140 of the projecting members 141.

The drum 142 may then be removed and a new one filled with a fresh supply of wrapping material substituted therefor. The members 141 are removed from the old drum and placed in the new drum, and when the new drum is rotated to deliver the wrapping material therefrom as needed, the friction between the semi-annular flanges 139 and the peripheral walls 140 of these members 141 will prevent the wrapping material from being delivered too rapidly. Prior to the wrapping operation the end of the strip on the drum 142 is inserted between some portions of the material to be wrapped or secured thereto by any tacky substance.

Before the end of the strip is secured to the bale, however, it is first passed between the friction plates 150 and 151, the plate 151 being provided with trunnions 152 extending through openings in alined links 72 of the conveyer chains 24, these trunnions 152 allowing the plate 151 to move freely about its axis to accommodate itself to the line of movement of the strip of wrapping material. The plate 150 is normally held in contact with the plate 151 by means of the springs 153 surrounding studs 154 extending through both plates 150 and 151 and provided with heads 155 between which and the plate 150 the springs 153 are interposed. By means of the nuts 156 on the opposite end of the studs 154, the friction on the strip of wrapping material may be adjusted in an obvious manner.

The strip of wrapping material then passes from between the plates 150 and 151 around the revoluble roll 157 to its point of attachment with the pile of annular members 19. This revoluble roll 157 is mounted in a frame 158 having a stud 159 extending through a plate 160. This stud is provided with a head 161 between which and the plate 160 is interposed a helical spring 162. Normally the plate 158 is separated from the plate 160 as shown in Fig. 3 of the drawings, the spring 162 being under tension.

As any slack occurs in the strip of wrapping material during the wrapping operation, the spring 162 will tend to move the roll 157 toward the plate 160 and take up this slack. The plate 160 is provided with trunnions 163 extending through links 72 of the conveyer chain 24. The provision of the trunnions 163 permits the plate 160 to be moved about the axis of the said trunnions to allow the roll 157 to accommodate itself to the wrapping operations as the endless conveyer 24—24 moves in the direction of the arrow a on Fig. 3 of the drawings.

The roll 157 is tapered as indicated in Fig. 10 of the drawings to facilitate the overlapping of the wrapping material as it is wound around the inside and outside of the pile of annular members 19. When the machine is in operation the movement imparted to the revoluble bale supports 17 and 20 will cause the bale of annular members 19 to be rotated slowly, while at the same time the endless conveyer 24—24 will be moved in the direction of the arrow *a* on Fig. 3 of the drawings. The end of the strip of wrapping material having been secured at some point upon the bale, this strip will be carried over the inner surface of the bale underneath the bottom thereof and then up over the outer surface of the bale.

During this movement the bale is being moved about its vertical axis by the bale supporting members 17 and 20, and consequently the strip of wrapping material in its next cycle of movement will overlap the next preceding strip, thus forming a helical wind of material over the inside and outside surfaces of the material as the wrapping operation continues.

When the wrapping operation is completed, the strip of wrapping material is cut from the roll and secured by any suitable adhesive substance to the completed package.

In order to facilitate removing sections of the conveyer 24 or inserting new sections therein, to shorten or lengthen the said conveyer, certain of the links 53 are connected by removable pins 163 having heads at one end and cotter pins 164 inserted through openings in the opposite ends, all as shown in the upper part of Fig. 9 of the drawings.

When the clutch 45—45* is operated to stop the rotary movement of the driving shaft 43, the conveyer 24 with the drum 142 thereon is not always in the proper position to make it accessible when it is desired to remove one drum and replace it with another. As a consequence it is desired that some means be provided whereby the conveyer 24 may be removed in the direction of the arrow *a* sufficiently to bring the drum 142 in position for ready removal. This is accomplished by means of the bevel gear 165 secured to the shaft 43 and meshing with the driving gear 166, the hub of which is revolubly mounted in the U-shaped member 167 loosely mounted upon the shaft 43. The front end of the hub of the gear 166 has secured thereto one part 168 of a clutch and is provided with a socket 169 adapted to receive the end of a revoluble shaft 170 having mounted thereon the other part 171 of said clutch.

The front end of the shaft 170 is mounted in a bearing 172 in the front plate 11 and has secured to its outer end the operating handle 173. Normally the clutch members 168 and 170 are separated as shown in Fig. 1 of the drawings, and the conveyer 24 is driven by means of the shaft 43. During the rotation of the shaft 43 the gears 165 and 166 will be rotated but will perform no operation inasmuch as the clutch members 168 and 170 are separated. When the clutch member 45 is thrown out of engagement with the driving pulley 45* and no further movement is imparted to the driving shaft 43 the conveyers 24 may be moved manually by first forcing the shaft 170 inwardly until the clutch members 168—171 are in engagement and then rotating the handle 173, the rotary movement of the handle being transmitted to the gear 166 and through it to the gear 165 and driving shaft 43. This mechanism makes it possible to move the conveyer 24 until the drum 142 is in a position where it is easily accessible so that it may be removed from the conveyer and a new drum substituted therefor.

This makes a very convenient package to be shipped, as the goods inclosed therein are protected from injury.

It is believed that the many advantages of this invention will be fully understood from the foregoing description.

Having thus described my invention, I claim:

1. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft on each side of said conveyer; means for rotating said shafts; two pressure rolls adapted to contact with the upper end of said bale; means on said shafts for revolving said rolls simultaneously; members movable vertically to raise and lower said rotating means, said members being provided with a plurality of rack teeth; revoluble pinions coacting with said rack teeth; and means for revolving said pinions simultaneously.

2. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft at one side of said conveyer; a bracket movable lengthwise of said shaft and provided with an arm having an opening in its end; a guide rod extending through said opening; means coacting with said arm for raising and lowering said bracket; a pressure roll carried by said bracket; and means movable with said bracket for rotating said pressure roll.

3. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft at one side of said conveyer; a bracket movable lengthwise of said shaft and provided with an arm having an elongated slot in its end; a guide rod extending through said opening; means coacting with said arm for raising and lowering said bracket; means for adjusting said bracket about the axis of said shaft; a pressure roll carried by said bracket; and means movable with said bracket for rotating said pressure roll.

4. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft at one side of said conveyer; a bracket movable lengthwise of said shaft and provided with an arm having an elongated slot in its end; a guide rod extending through said slot; means coacting with said arm for raising and lowering said bracket; two members disposed on opposite sides of said arm for adjusting said bracket about the axis of said shaft; a pressure roll carried by said bracket; and means movable with said bracket for rotating said pressure roll.

5. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft at one side of said conveyer; a bracket movable lengthwise of said shaft and provided with an arm having an opening in its end; a guide rod extending through said opening; a vertically moving member coacting with said arm for raising and lowering said bracket and provided with rack teeth; a revoluble pinion meshing with said rack teeth; a pressure roll carried by said bracket; and means movable with said bracket for rotating said pressure roll.

6. In a machine of the class described, the combination of a plurality of revoluble supporting members; an endless flexible conveyer adapted to pass through and endwise of the outside of a bale supported on said members; means for driving said conveyer including a clutch mechanism having an operating lever; a support movable with said conveyer and carrying a strip of wrapping material in a revoluble roll; a pivoted arm provided with a surface at its outer end adapted to contact with said conveyer; and means for moving said arm about its pivot including a handle adapted to be moved into the path of said clutch operating lever to prevent its movement in a direction to start said driving mechanism.

7. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a pivoted arm provided with a surface at its outer end adapted to contact with said conveyer; an oscillating shaft; an operating handle therefor; an arm on said oscillating shaft; and an adjustable connector between the outer ends of said arms.

8. In a machine of the class described, the combination of a plurality of revoluble supporting members; an endless flexible conveyer adapted to pass through and endwise of the outside of a bale supported on said members; means for driving said conveyer; a bracket adapted to support the upper part of said conveyer; a support movable with said conveyer and carrying a strip of wrapping material in a revoluble roll; and a pivoted stop lug adapted to be moved against said bracket into position to engage said conveyer and prevent its backward movement.

9. In a machine of the class described, the combination of a plurality of revoluble supporting members; an endless conveyer adapted to pass through and endwise of the outside of a bale supported on said members and having a plurality of outwardly extending rolls; a curved bracket provided with a track for said rolls above said bale; means for driving said conveyer; a support movable with said conveyer and carrying a strip of wrapping material in a revoluble roll; and a dog pivoted to the end of said bracket and adapted to be moved about its pivot into position to engage one of said rolls and prevent backward movement of said conveyer.

10. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft at one side of said conveyer; a worm wheel on said shaft; a worm meshing therewith; a shaft for said worm; a gear on said worm shaft; a driving gear; a member pivotally mounted on said worm shaft; an intermediate gear carried by said member and transmitting motion from said driving gear to said worm-shaft-gear; means for locking said pivoted member in adjusted position; and means actuated by said vertical shaft for imparting rotary movement to one of said supporting members.

11. In a machine of the class described, the combination of a plurality of revoluble supporting members; an endless flexible conveyer adapted to pass through and endwise of the outside of a bale supported on said members; means for driving said conveyer; a support movable with said conveyer and carrying a strip of wrapping material in a revoluble roll; a vertical shaft at one side of said conveyer; a worm wheel on said shaft; a worm meshing therewith; a shaft for said worm; a gear on said worm shaft; a driving gear; a member pivotally mounted on said worm shaft and provided with a slot therein; an intermediate gear carried by said member and transmitting motion from said driving gear to said worm-shaft-gear; a clamping bolt extending through said slot into the frame; and means actuated by said vertical shaft for imparting rotary movement to one of said supporting members.

12. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a revoluble roll carrying a strip of wrapping material; members projecting from opposite faces of said roll; and a friction device carried by said conveyer and engaging the periphery of said projecting members, said device consisting of two parts pivoted together at one end and provided with locking means at the opposite end.

13. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a revoluble roll carrying a strip of wrapping material; members projecting from opposite faces of said roll and having inclined peripheral walls; and a friction device carried by said conveyer and engaging the periphery of said projecting members, said device consisting of two parts pivoted together at one end and provided with locking means at the opposite end.

14. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a revoluble roll carrying a strip of wrapping material; members projecting from opposite faces of said roll; and a friction device carried by said conveyer and engaging the periphery of said projecting members, said device consisting of two parts, one of which is secured to said conveyer and is provided with a pivot pin at one end and a pivoted bail at the other having a spring pressed locking bolt, while the other part is mounted upon said pivot pin and provided at its opposite end with a locking shoulder coacting with said bolt.

15. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a revoluble roll carrying a strip of wrapping material; members projecting from opposite faces of said roll; and a friction device carried by said conveyer and engaging the periphery of said projecting members, said device consisting of two parts, one of which is secured to said conveyer and is provided with a pivot pin at one end and a pivoted bail at the other having a spring pressed locking bolt and means for adjusting the tension of said spring, while the other part is mounted upon said pivot pin and provided at its opposite end with a locking shoulder coacting with said bolt.

16. In a machine of the class described, the combination of a plurality of revoluble supporting members; means for imparting rotary movement to one of said supporting members; an endless flexible conveyer adapted to pass through and endwise of the outside of a bale supported on said members; a shaft for moving said conveyer; power mechanism for actuating said shaft; means for disconnecting said power mechanism from said shaft; a support movable with said conveyer and carrying a strip of wrapping material in a revoluble roll; and manually operated means for rotating said driving shaft when said power mechanism is disconnected therefrom.

17. In a machine of the class described, the combination of a plurality of revoluble supporting members; means for imparting rotary movement to one of said supporting members; an endless flexible conveyer adapted to pass through and endwise of the outside of a bale supported on said members; a driving shaft for moving said conveyer; power mechanism for actuating said shaft; a support movable with said conveyer and carrying a strip of wrapping material in a revoluble roll; a gear on said driving shaft; a driving gear meshing therewith; means for disconnecting the power from said shaft; and manually operated means for actuating said driving gear when the power mechanism is disconnected therefrom.

18. In a machine of the class described, the combination of a plurality of revoluble supporting members; means for imparting rotary movement to one of said supporting members; an endless flexible conveyer adapted to pass through and endwise of the outside of a bale supported on said members; a driving shaft for moving said conveyer; power mechanism for actuating said shaft; a support movable with said conveyer and carrying a strip of wrapping material in a revoluble roll; a gear on said driving shaft; a driving gear meshing therewith; manually operated means for actuating said driving gear; means for disconnecting said power mechanism from said shaft; and means whereby said manually operated means may be connected and disconnected from said driving gear.

19. In a machine of the class described, the combination of a plurality of revoluble supporting members; means for imparting rotary movement to one of said supporting members; an endless flexible conveyer adapted to pass through and endwise of the outside of a bale supported on said members; a driving shaft for moving said conveyer; power mechanism for actuating said shaft; means for disconnecting said power mechanism from said shaft; a support movable with said conveyer and carrying a strip of wrapping material in a revoluble roll; a gear on said driving shaft; a U-shaped member loosely mounted on said driving shaft; a driving gear revolubly mounted in said member and meshing with the gear on said driving shaft; and manually operated means for actuating said driving gear when the power mechanism is disconnected from said driving shaft.

20. In a machine of the class described, the combination of a plurality of revoluble supporting members; means for imparting rotary movement to one of said supporting members; an endless flexible conveyer adapted to pass through and endwise of the outside of a bale supported on said members; a driving shaft for moving said conveyer; power mechanism for actuating said shaft; means for disconnecting said power mechanism from said shaft; a support movable with said conveyer and carrying a strip of wrapping material in a revoluble roll; a gear on said driving shaft; a U-shaped member loosely mounted on said driving shaft; a driving gear revolubly mounted in said member and meshing with the gear on said driving shaft; manually operated means for actuating said driving gear; and means whereby said manually operated means may be connected and disconnected from said driving gear.

Signed by me at Boston, Mass., this 2d day of August, 1916.

GEORGE W. PROUTY.

Witnesses:
EDWARD F. ALLEN,
WALTER E. LOMBARD.